(12) United States Patent  (10) Patent No.: US 8,125,780 B2
Goth et al.  (45) Date of Patent: Feb. 28, 2012

(54) IN-LINE MEMORY MODULE COOLING SYSTEM

(75) Inventors: Gary F. Goth, Pleasant Valley, NY (US); Randall G. Kemink, Poughkeepsie, NY (US); Katie L. Pizzolato, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 12/645,400

(22) Filed: Dec. 22, 2009

(65) Prior Publication Data

US 2011/0149505 A1   Jun. 23, 2011

(51) Int. Cl.
*H05K 7/20* (2006.01)
(52) U.S. Cl. ....... 361/699; 165/80.4; 361/704; 361/708; 361/715; 361/719
(58) Field of Classification Search .......... None
See application file for complete search history.

(56) References Cited

U.S. PATENT DOCUMENTS

| | | | | |
|---|---|---|---|---|
| 4,186,422 A | * | 1/1980 | Laermer | 361/689 |
| 4,771,366 A | * | 9/1988 | Blake et al. | 361/705 |
| 6,349,035 B1 | * | 2/2002 | Koenen | 361/719 |
| 6,496,375 B2 | * | 12/2002 | Patel et al. | 361/719 |
| 6,687,126 B2 | * | 2/2004 | Patel et al. | 361/702 |
| 7,907,398 B2 | * | 3/2011 | Hrehor et al. | 361/679.53 |
| 2006/0250772 A1 | | 11/2006 | Salmonson et al. | 361/698 |
| 2006/0268519 A1 | * | 11/2006 | Bartley et al. | 361/699 |
| 2007/0002536 A1 | | 1/2007 | Hall et al. | 361/695 |
| 2007/0091570 A1 | | 4/2007 | Campbell et al. | 361/699 |
| 2008/0291630 A1 | * | 11/2008 | Monh et al. | 361/700 |
| 2009/0002951 A1 | * | 1/2009 | Legen et al. | 361/715 |
| 2009/0277616 A1 | * | 11/2009 | Cipolla et al. | 165/104.33 |
| 2010/0025010 A1 | * | 2/2010 | Cipolla et al. | 165/47 |
| 2010/0085712 A1 | * | 4/2010 | Hrehor et al. | 361/699 |

* cited by examiner

*Primary Examiner* — Gregory Thompson
(74) *Attorney, Agent, or Firm* — Dennis Jung

(57) ABSTRACT

A system to aid in cooling an in-line memory module may include a thermal interface material adjacent the in-line memory module. The system may also include a heat spreader adjacent the thermal interface material. The system may further include a cold-plate adjacent the heat spreader, the cold-plate, heat spreader, and thermal interface material to aid in cooling the in-line memory module.

3 Claims, 6 Drawing Sheets

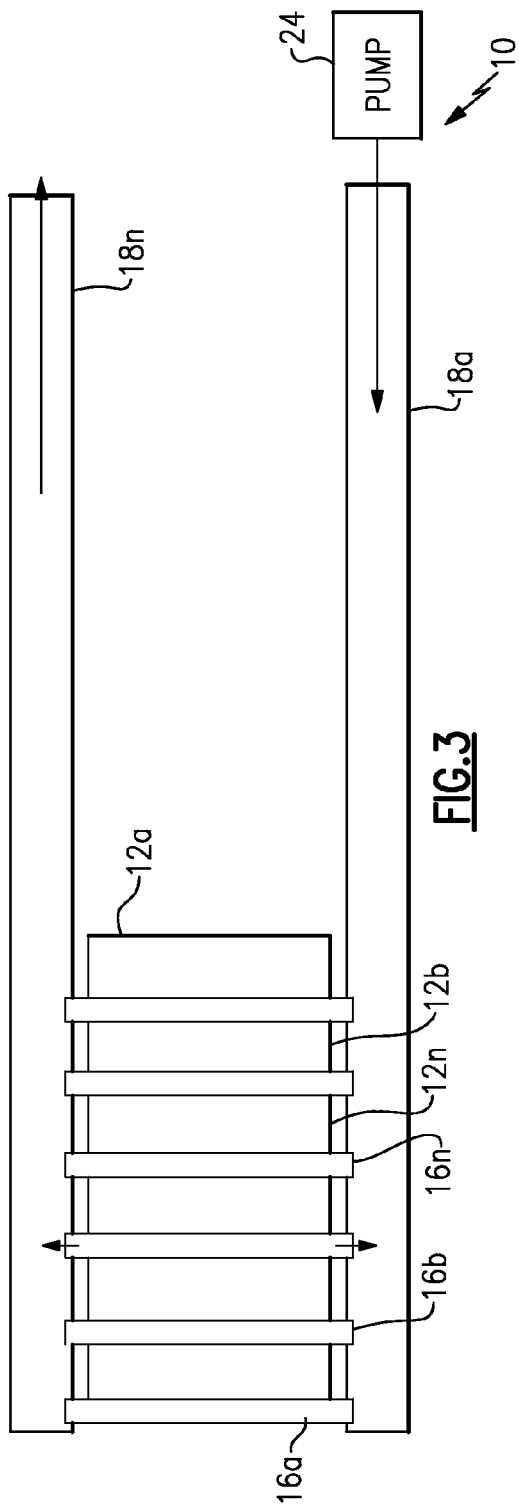
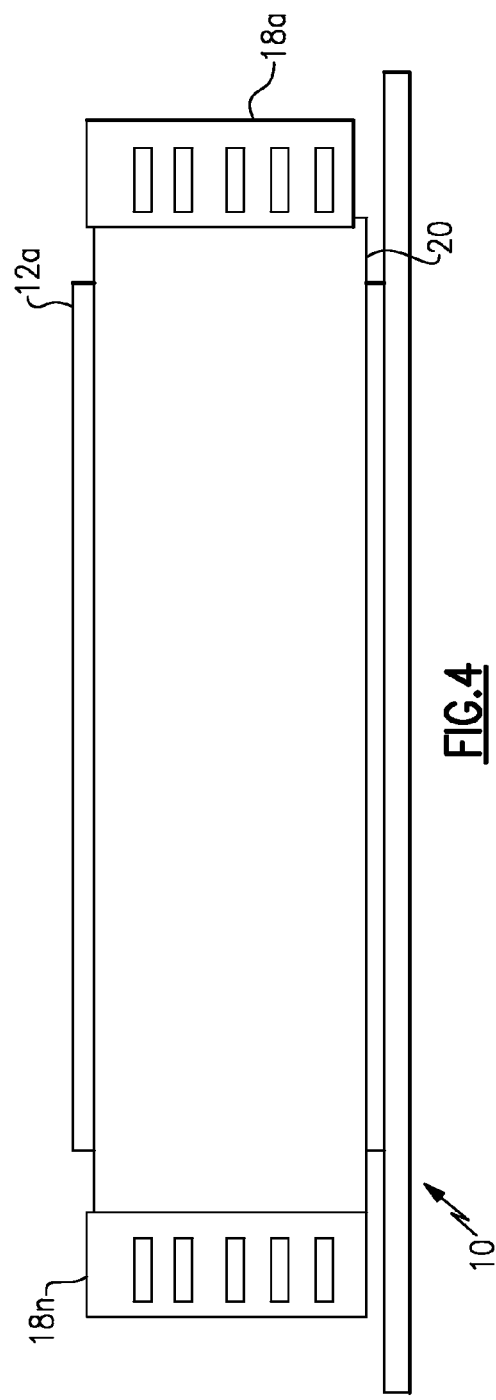

IN-LINE MEMORY MODULE COOLING SYSTEM

BACKGROUND OF THE INVENTION

1. Field of the Invention

The invention relates to the field of computer systems, and, more particularly, to a system to cool an in-line memory module.

2. Description of Background

Generally, an in-line memory module is a printed circuit board that may carry random access memory ("RAM"), application-specific integrated circuits ("ASIC"), surface mount components ("SMC"), electrical contacts, and/or the like. The in-line memory module usually plugs into another printed circuit board carrying additional electronic components.

A heat spreader is a component that may efficiently transfer heat from one area to another area. The heat spreader usually has high thermal conductivity.

SUMMARY OF THE INVENTION

According to one embodiment of the invention, a system to aid in cooling an in-line memory module may include a thermal interface material adjacent the in-line memory module. The system may also include a heat spreader adjacent the thermal interface material. The system may further include a cold-plate adjacent the heat spreader, and the cold-plate, heat spreader, and thermal interface material to aid in cooling the in-line memory module.

The cold-plate may include an enclosed fluid pathway. The cold-plate may be joined to the heat spreader. The cold-plate may be joined to the heat spreader by filler metal joinery and/or curable materials.

The cold-plate may be joined to an end of the heat spreader. The cold-plate joined to the heat spreader does not prevent the in-line memory module from being removed.

The thermal interface material may include a conformal material. The conformal material may include a thermal pad, a thermal pad with a non-stick surface, and/or thermal paste. The in-line memory module may be fully buffered.

In one embodiment, the system may include thermal interface material adjacent both sides of an in-line memory module. The system may further include heat spreaders adjacent both thermal interface materials. The system may additionally include a cold-plate adjacent both heat spreaders, and the cold-plate, heat spreaders, and thermal interface materials to aid in cooling the in-line memory module.

The cold-plate may include an enclosed fluid pathway joined to at least one of the heat spreaders. The cold-plate may be joined to the ends of at least one of the heat spreaders. The cold-plate joined to at least one of the heat spreaders does not prevent the in-line memory module from being removed.

In one embodiment, the system may include thermal interface material adjacent both sides of a first in-line memory module, and heat spreaders adjacent the thermal interface materials. The system may also include other thermal interface material adjacent both sides of a second in-line memory module, and additional heat spreaders adjacent the other thermal interface materials. The system may further include a conduction bar adjacent one of the heat spreaders and one of the additional heat spreaders, and the conduction bar between the first in-line memory module and the second in-line memory module. The system may additionally include a cold-plate adjacent the conduction bar, and the cold-plate, all heat spreaders, conduction bar, and all thermal interface materials to aid in cooling the first and second in-line memory modules.

The cold-plate may include an enclosed fluid pathway joined to the conduction bar and/or at least one of all heat spreaders. The cold-plate may include a pump to circulate fluid through the enclosed fluid pathway.

The cold-plate may be joined to the conduction bar and/or at least one of all heat spreaders by filler metal joinery and/or curable materials. The cold-plate may be joined to the conduction bar and/or the ends of at least one of all heat spreaders. The cold-plate joined to the conduction bar and/or the ends of at least one of all heat spreaders does not prevent any of the in-line memory modules from being removed.

BRIEF DESCRIPTION OF THE DRAWINGS

FIG. 3 is a top-view diagram of another embodiment of the system of FIG. 1 in accordance with the invention.

FIG. 4 is an end-view of the embodiment of FIG. 3.

DETAILED DESCRIPTION OF THE INVENTION

Figure 1:
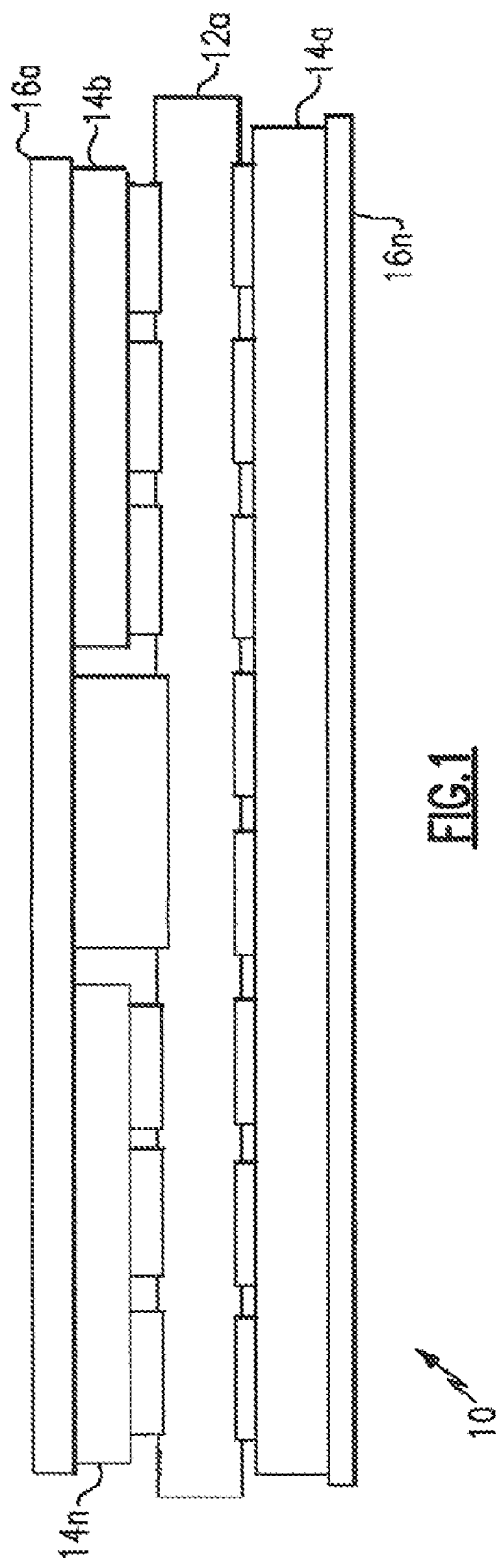
FIG. 1 is a diagram of a system to cool an in-line memory module in accordance with the invention.
Figure 2:
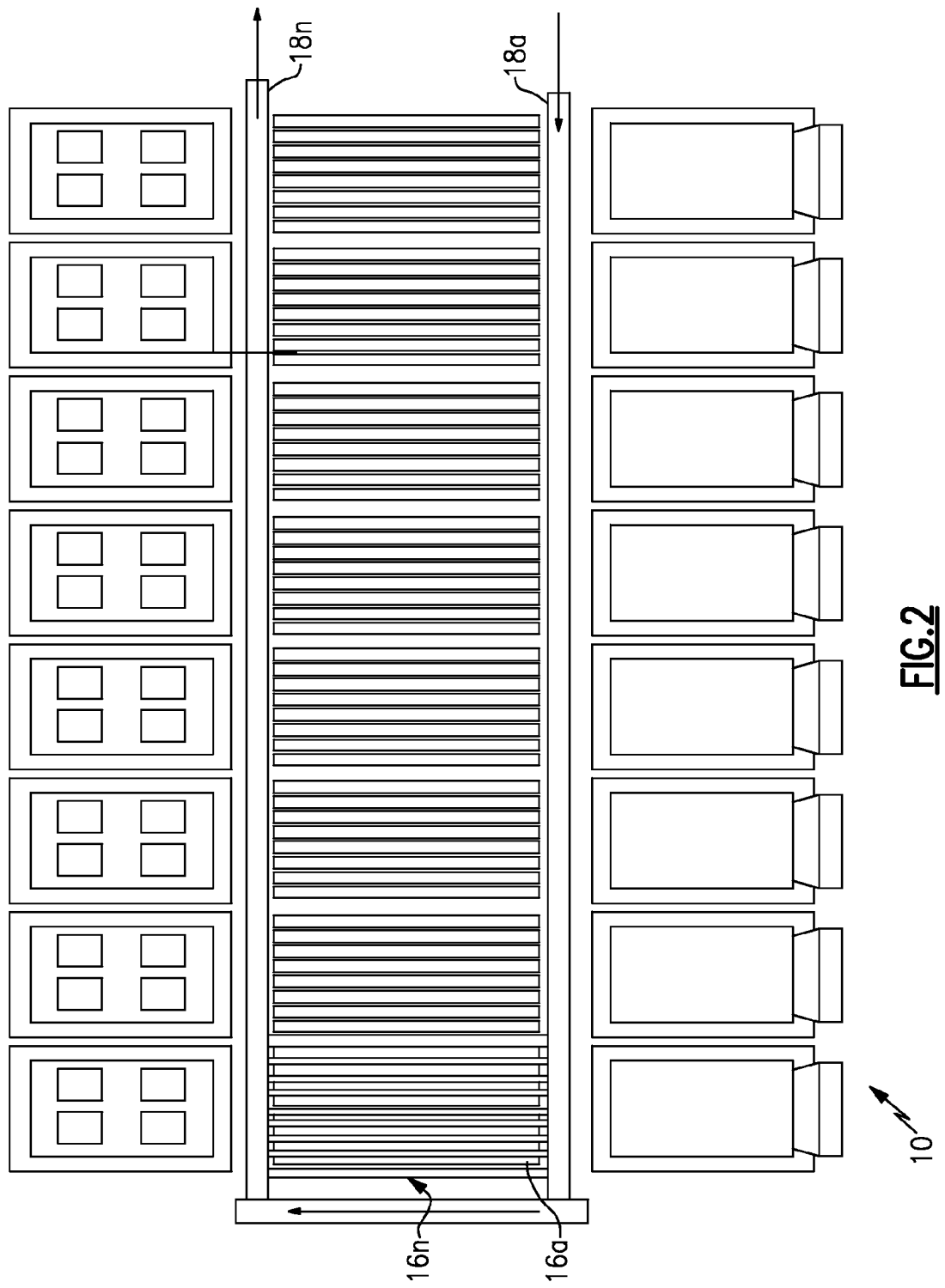
FIG. 2 is a diagram of the system of FIG. 1 as used in one embodiment with multiple central processing units on one side and hub modules on the other in accordance with the invention.

The invention will now be described more fully hereinafter with reference to the accompanying drawings, in which preferred embodiments of the invention are shown. Like numbers refer to like elements throughout, like numbers with letter suffixes are used to identify similar parts in a single embodiment, letter suffix lower case n is a variable that indicates an unlimited number of similar elements, and prime notations are used to indicate similar elements in alternative embodiments.

It should be noted that in some alternative implementations, the functions noted in a flowchart block may occur out of the order noted in the figures. For example, two blocks shown in succession may, in fact, be executed substantially concurrently, or the blocks may sometimes be executed in the reverse order, depending upon the functionality involved.

With reference now to FIGS. 1-4, a system 10 to aid in cooling an in-line memory module 12a-12n is initially described. According to one embodiment of the invention, the system 10 includes a thermal interface material 14a-14n adjacent the in-line memory module 12. In one embodiment, the system 10 also includes a heat spreader 16a-16n adjacent the thermal interface material 14a-14n. In another embodiment, the system 10 further includes a cold-plate 18a-18n adjacent the heat spreader 16a-16n, and the cold-plate 18a-18n, heat spreader 16a-16n, and thermal interface material to aid in cooling the in-line memory module 12a-12n.

In one embodiment, the cold-plate 18a-18n is an enclosed fluid pathway. In another embodiment, the cold-plate 18a-18n is joined to the heat spreader 16a-16n. In another embodiment, the cold-plate 18a-18n is joined to the heat spreader 16a-16n by filler metal joinery and/or curable materials.

In one embodiment, the cold-plate 18a-18n is joined to an end of the heat spreader 16a-16n. In another embodiment, the cold-plate 18a-18n joined to the heat spreader 16a-16n does not prevent the in-line memory module 12a-12n from being removed.

In one embodiment, the thermal interface material 14a-14n includes a conformal material. In another embodiment, the conformal material includes a thermal pad, a thermal pad with a non-stick surface, and/or thermal paste. In another embodiment, the in-line memory module 12a-12n is fully buffered.

In one embodiment, the system 10 includes thermal interface material 14a-14n adjacent both sides of an in-line memory module 12a-12n. In another embodiment, the system 10 further includes heat spreaders 16a-16n adjacent both thermal interface materials 14a-14n. In another embodiment, the system 10 additionally includes a cold-plate 18a-18n adjacent both heat spreaders 14a-14n, and the cold-plate 18a-18n, heat spreaders 16a-16n, and thermal interface materials 14a-14n to aid in cooling the in-line memory module 12a-12n.

In one embodiment, the cold-plate 18a-18n includes an enclosed fluid pathway joined to at least one of the heat spreaders 16a-16n. In another embodiment, the cold-plate 18a-18n is joined to the ends of at least one of the heat spreaders 16a-16n. In another embodiment, the cold-plate 18a-18n joined to at least one of the heat spreaders 16a-16n does not prevent the in-line memory module 12a-12n from being removed.

In one embodiment, the system 10 includes thermal interface material 14a-14b adjacent both sides of a first in-line memory module 12a, and heat spreaders 16a-16b adjacent the thermal interface materials. In another embodiment, the system 10 also includes other thermal interface material 14a-14b adjacent both sides of a second in-line memory module 12n, and additional heat spreaders 16c-16n adjacent the other thermal interface materials 14c-14n. In one embodiment, the system 10 further includes a conduction bar 20 adjacent one of the heat spreaders 14a-14b and one of the additional heat spreaders 14c-14n, and the conduction bar 20 between the first in-line memory module 12a and the second in-line memory module 12n. In another embodiment, the system 10 additionally includes a cold-plate 18a-18n adjacent the conduction bar 20, and the cold-plate, all heat spreaders 16a-16n, conduction bar, and all thermal interface materials 14a-14n to aid in cooling the first and second in-line memory modules 12n.

In one embodiment, the cold-plate 18a-18n includes an enclosed fluid pathway joined to the conduction bar 20 and/or at least one of all heat spreaders 16a-16n. In another embodiment, the cold-plate 18a-18n includes a pump 24 to circulate fluid through the enclosed fluid pathway.

In one embodiment, the cold-plate 18a-18n is joined to the conduction bar 18a-18n and/or at least one of all heat spreaders 16a-16n by filler metal joinery and/or curable materials. In another embodiment, the cold-plate 18a-18n is joined to the conduction bar 20 and/or the ends of at least one of all heat spreaders 16a-16n. In another embodiment, the cold-plate 18a-18n joined to the conduction bar 20 and/or the ends of at least one of all heat spreaders 16a-16n does not prevent any of the in-line memory modules 12a-12n from being removed.

In view of the foregoing, the system 10 aids in cooling an in-line memory module 12a-12n. As a result, the system 10 improves signal integrity of high-speed signals by reducing the impedance discontinuity between the ball grid array and ball grid array pads, for example.

In one embodiment, the problem solved is how to cool 50 to 150 watt buffered Memory dual in-line memory modules ("DIMMs") 12a-12n on tight pitches. Currently DIMMs are air cooled individually. Limitations of air cooling are in the 10 to 30 watt range.

In one embodiment, system 10 provides a practical means to water cool fully buffered DIMMs 12a-12n placed on a tight pitch. In another embodiment, the system 10 provides a "water coolable DIMM package" (or WDP) by sandwiching a DIMM between conformal pads, e.g. thermal interface material 14a-14n, and/or thermal grease. In another embodiment, the system 10 is then sandwiched between two flat plates, e.g. heat spreader 16a-16n, typically copper or aluminum. The exposed surfaces of these two metal plates become the heat transfer surfaces for heat generated internal to the DIMM 12a-12n.

In one embodiment, the system 10 provides a coldplate 18a-18n consisting of two rectangular brazed coldplates running perpendicular to and just outside the DIMMs 12a-12n. In another embodiment, copper or aluminum plates 16a-16n are placed between each DIMM 12a-12n.

In one embodiment, these plates 16a-16n are attached to the coldplates 18a-18n on each end of the DIMMs 12a-12n via either soldering or thermal epoxy. In another embodiment, water is run through the two coldplates 18a-18n on each end.

In one embodiment, the heat in the DIMMs 12a-12n is conducted out through the thermal surfaces of the WDP. In another embodiment, a thin layer of conformal material 14a-14n such as a thermal pad with non-stick surface and/or thermal paste is placed between the WDP and the conduction plates 16a-16n that run parallel and adjacent to each DIMM 12a-12n. These plates 16a-16n conduct the heat to the coldplates 18a-18n on each end.

The system 10 provides an easy and compact means to water cool densely DIMMs 12a-12n. The system 10 also provides the capability to plug and unplug each DIMM 12a-12n in a very standard manner, despite being water cooled. For example, the system 10 provides the capability to service individual DIMMs 12a-12n in the field without breaking water lines. In other words, the system 10 is serviced like standard DIMMs 12a-12n in that the DIMM is removed by itself and not the coldplate 18a-18n.

In one embodiment, the thermal interface material 14a-14n, e.g. thermagap conformal pads, account for misalignment and compliance. In another embodiment, the WDP width is 0.3 mm wider than stationary conduction plates gap.

In one embodiment, the top copper plate 16a-16n is ½ to 1 mm thick. In another embodiment, two smaller plates 16a-16n are provided over the dynamic random access memory.

In one embodiment, the lower copper plate 16a-16n attached to an uncompressed conformal pad 14a-14n. In another embodiment, in the process of inserting the WDP between water cooled plates 16a-16n, misalignments and tolerances can be eliminated via the conformance of a chomerics pad 14a-14n. In another embodiment, the heat spreader 16a-16n includes a central 0.15 mm recess in the copper plates to capture paste 14a-14n on DIMM 12a-12n insertion and extraction.

In one embodiment, the conduction bar 20 is soldered to the coldplates 18a-18n. In another embodiment, between and parallel to each DIMM 12a-12n row have a thick copper plate 20. In another embodiment, each ends of the conduction bar 20 are brazed to coldplates 18a-18n that run perpendicular to DIMMs 12a-12n. In another embodiment, alignment pins in the board assures proper location of coldplate assembly 18a-18n to the WDPs.

Figure 5:
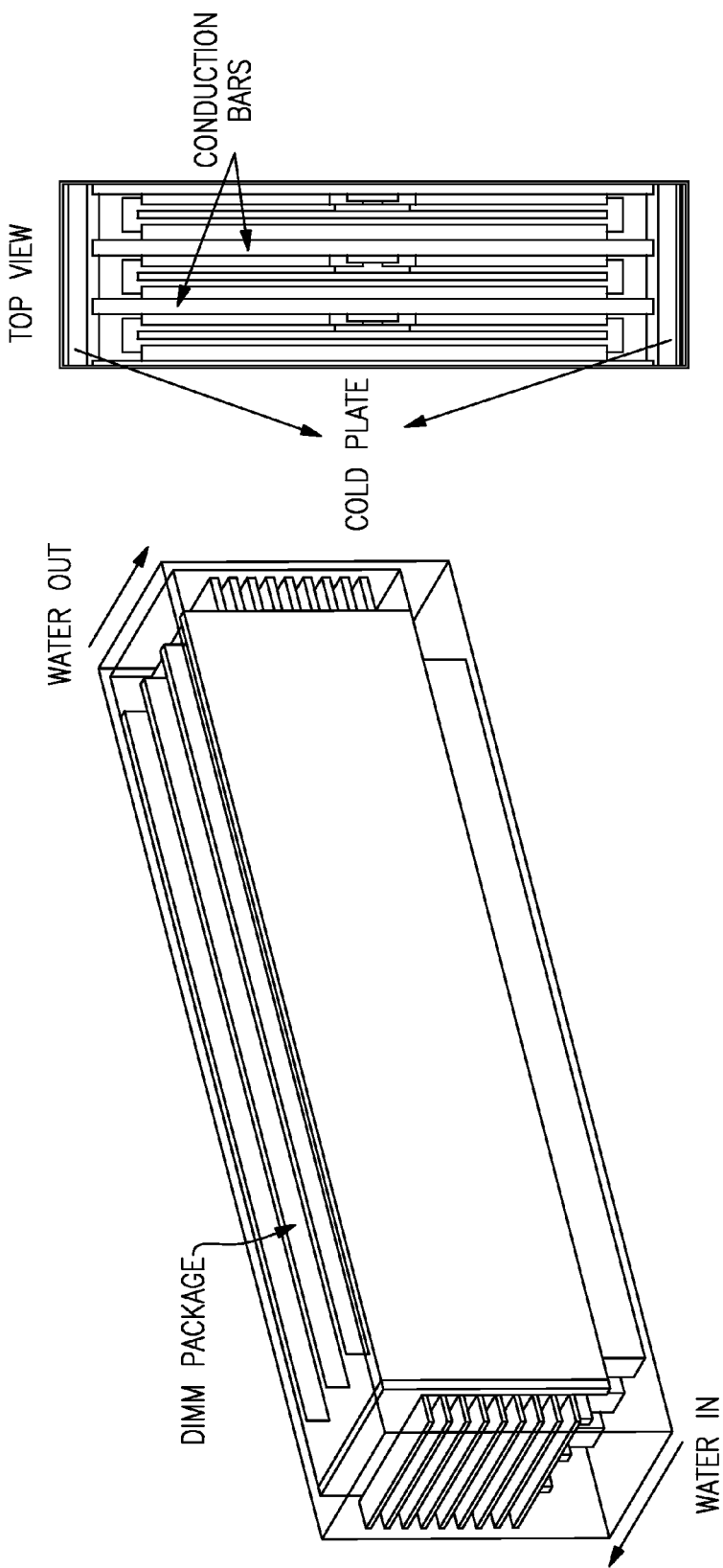
FIG. 5 is a diagram of another embodiment of FIG. 1 in accordance with the invention.
Figure 6:
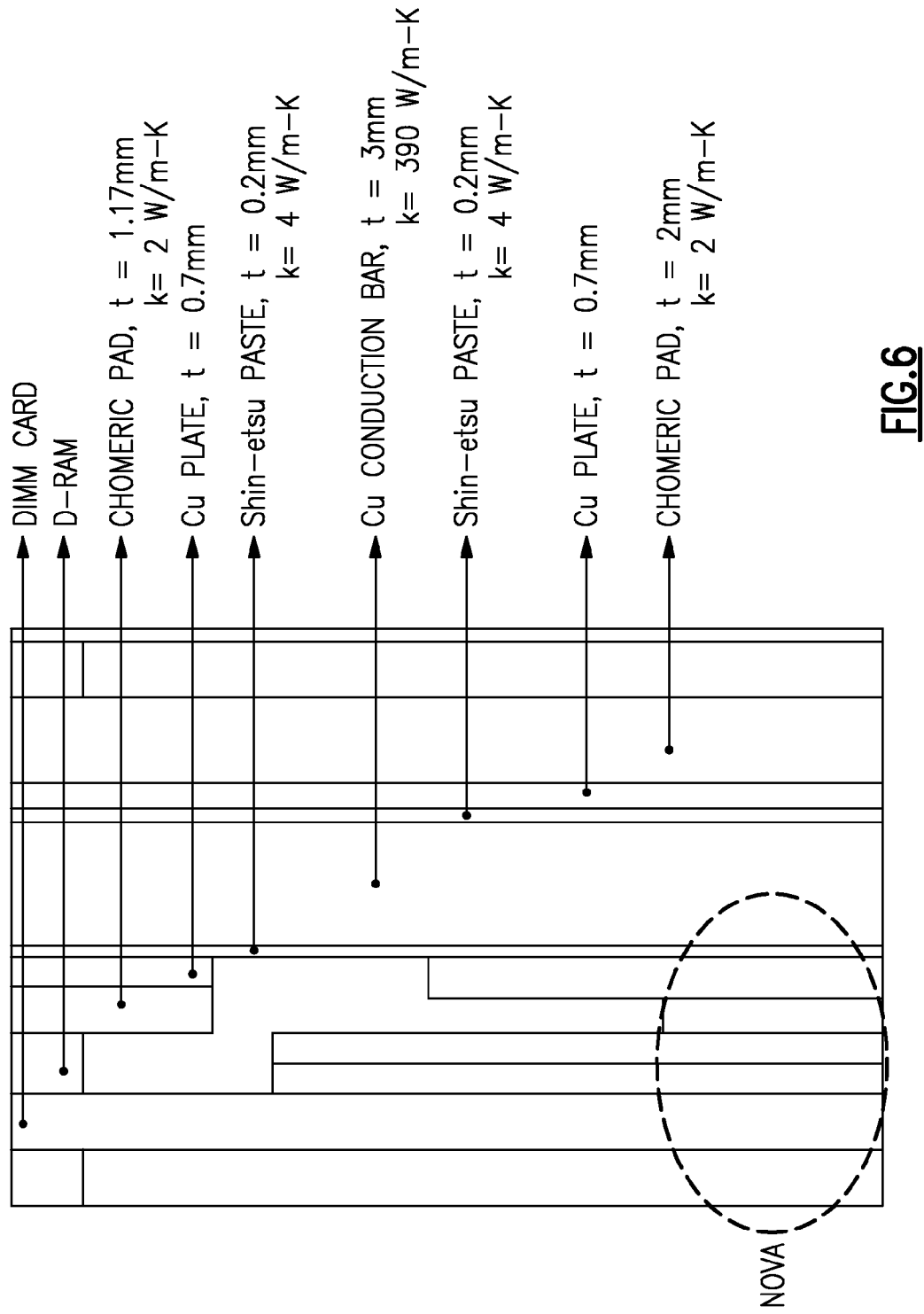
FIG. 6 is a cross-sectional view diagram of another embodiment of FIG. 1 in accordance with the invention.
Figure 7:
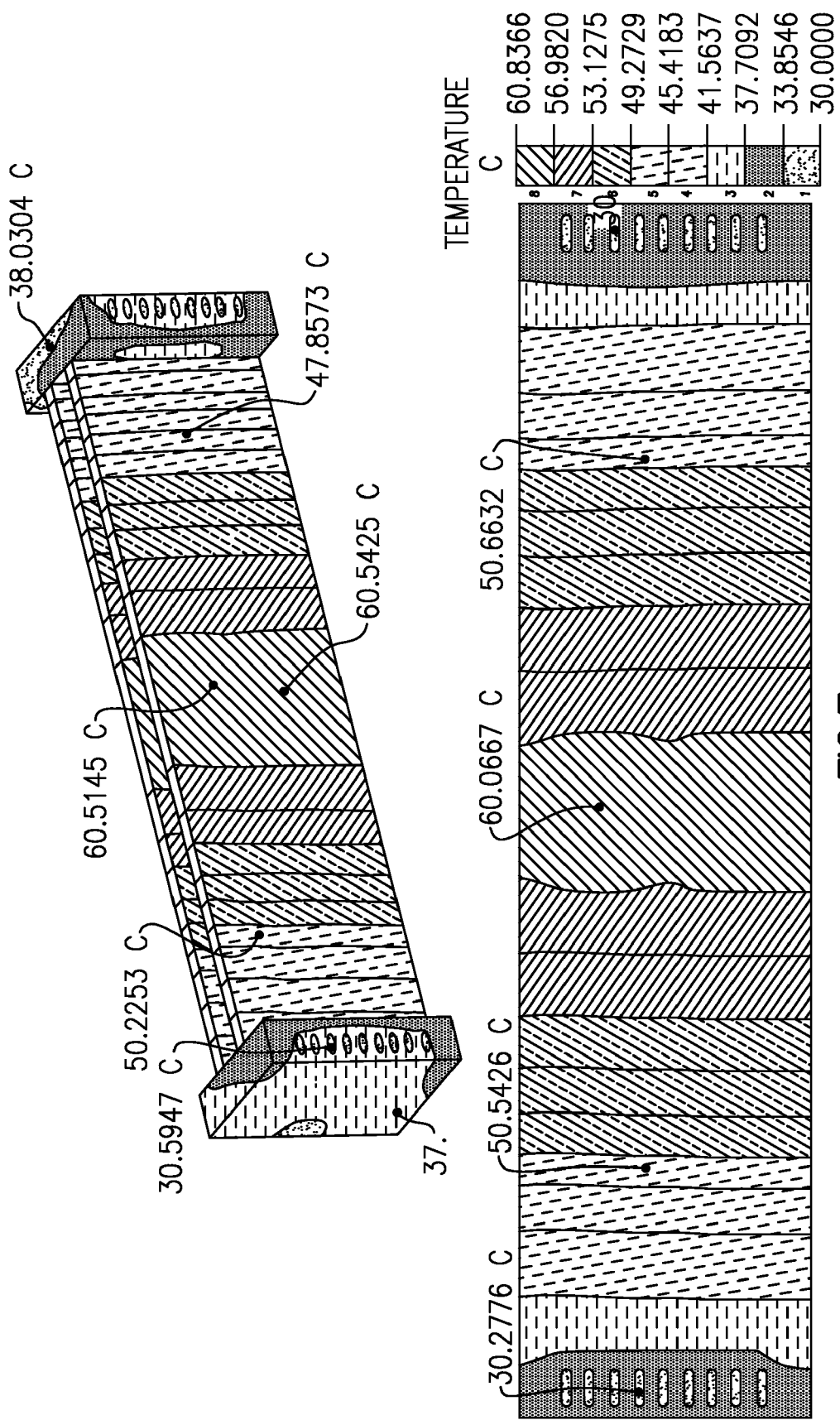
FIG. 7 is a diagram illustrating experimental results of cold plate temperatures in accordance with the invention.

FIG. 5 is a diagram of 3 DIMM's with a coldplate system as used in another embodiment. FIG. 6 is a cross-sectional view diagram of a DIMM package with conduction plate embodiment. FIG. 7 illustrates experimental results of cold plate temperatures in one embodiment of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system comprising:
    thermal interface material adjoining both sides of an in-line memory module;
    separate heat spreaders adjoining the thermal interface material on one side of the in-line memory module respectively;
    other thermal interface material adjoining both sides of a second in-line memory module;
    additional heat spreaders adjoining said other thermal interface materials;
    a conduction bar adjacent one of said heat spreaders and one of said additional heat spreaders, and said conduction bar between the first in-line memory module and the second in-line memory module; and
    a cold-plate adjoining said heat spreaders, and said cold-plate, all heat spreaders, conduction bar, and all thermal interface materials to aid in cooling the first and second in-line memory modules.

2. The system of claim 1 wherein said cold-plate comprises an enclosed fluid pathway joined to at least one of said conduction bar and at least one of all heat spreaders.

3. The system of claim 2 wherein said cold-plate further comprises a pump to circulate fluid through said enclosed fluid pathway.

* * * * *